US008650483B2

(12) United States Patent
Liu et al.

(10) Patent No.: US 8,650,483 B2
(45) Date of Patent: Feb. 11, 2014

(54) METHOD AND APPARATUS FOR IMPROVING THE READABILITY OF AN AUTOMATICALLY MACHINE-GENERATED SUMMARY

(76) Inventors: Shi Xia Liu, Beijing (HK); Li Ping Yang, Beijing (HK)

( * ) Notice: Subject to any disclaimer, the term of this patent is extended or adjusted under 35 U.S.C. 154(b) by 3129 days.

(21) Appl. No.: 10/904,100

(22) Filed: Oct. 22, 2004

(65) Prior Publication Data

US 2005/0091203 A1   Apr. 28, 2005

(30) Foreign Application Priority Data

Oct. 22, 2003   (CN) .......................... 2003 1 0101752

(51) Int. Cl.
*G06F 17/21* (2006.01)
(52) U.S. Cl.
USPC ....................................................... 715/254
(58) Field of Classification Search
USPC .................... 715/200, 205, 234, 254, 760
See application file for complete search history.

(56) References Cited

U.S. PATENT DOCUMENTS

| 5,924,108 | A  | * | 7/1999 | Fein et al. ...................... 715/267 |
| 6,029,182 | A  | * | 2/2000 | Nehab et al. ................... 715/205 |
| 6,353,824 | B1 | * | 3/2002 | Boguraev et al. ................. 707/5 |

OTHER PUBLICATIONS

LeVitus et al, 'Macworld Microsoft Office 2001 Bible', IDG Books Worldwide, Inc, 2001, pp. 65-69.*

Barzilay, R. et al., "Information Fusion in the Context of Multi-Document Summarization." ACL '99 Proceedings of the 37th annual meeting of the Association for Computational Linguistics on Computational Linguistics. Stroudsburg, PA, USA. Jun. 1999, pp. 550-557.
Barzilay, R. et al., "Sentence Ordering in Multidocument Summarization." HLT '01 San Diego, California USA. Mar. 2001, pp. 1-7.
Jing, H. et al., "The Decomposition of Human-Written Summary Sentences." SIGIR '99, Berkley, CA USA. Aug. 1999, pp. 1-8.
Knight, K. et al., "Summarization beyond sentence extraction: A probabilistic approach to sentence compression.", Marina del Rey, CA, USA. May 11, 2001, pp. 91-107.
Mani, I. et al., "Improving Summaries by Revising Them." ACL '99 Proceedings of the 37th annual meeting of the Association for Computational Linguistics on Computational Linguistics. Stroudsburg, PA, USA. Jun. 1999, pp. 558-565.
Marcu, D. et al., "An Inquiry into the Nature of Multidocument Abstracts, Extracts, and Their Evaluation." Proceedings of the NAACL-2001 Workshop on Automatic Summarization, Pittsburgh, PA. Jun. 3, 2001, pp. 2-11.

(Continued)

*Primary Examiner* — Cesar Paula
(74) *Attorney, Agent, or Firm* — Fleit Gibbons Gutman Bongini & Bianco PL; Thomas Grzesik (57) ABSTRACT

According to the present invention, there is provided a method and system for automatically generating a summary for a textual document, and relevant applications. The method and system includes segmenting a given textual document into document segments, wherein the document segments are words, sentences or paragraphs in the textual document; extracting a number of the document segments to form an initial summary for the document; for each of the document segments in the initial summary, calculating the correlation degrees between the document segment and its neighboring document segments, wherein the neighboring document segments of a given document segment refer to the document segments within a predefined distance from the given document segment; and adding the document segments with higher correlation degrees into the initial summary.

16 Claims, 8 Drawing Sheets

(56) References Cited

OTHER PUBLICATIONS

McKeown, K. et al., "Towards Multidocument Summarization by Reformulation: Progress and Prospects.", Proceeding AAAI '99/ IAAI '99 Proceedings of the sixteenth national conference on Artificial intelligence and the eleventh Innovative applications of artificial intelligence conference innovative applications of artificial intelligence, Menlo Park, CA. Jul. 1999, pp. 453-460.

* cited by examiner

```
This competition has only five events, men's and women's singles, men's and women's doubles, and men's and women's mixed.

men's singles   women's singles   men's doubles   women's doubles   mixed
              men's singles     women's singles     men's doubles     women's doubles
                (China)            (China)             (China)           (China)           (China)

men's singles     women's singles     men's doubles     women's doubles
                (China)            (China)             (China)          (Thailand)        (Hong Kong)

Time   Location   10   men's singles   women's singles   men's doubles   women's doubles   mixed
    Time   Location   10   men's singles   women's singles   men's doubles   women's doubles   mixed
    Time   Location   10   men's singles   women's singles   men's doubles   women's doubles   mixed
                                (China)           (China)         (player A)       (player B)
```

FIG. 3A

```
This event has five single's competitions, men's singles, women's singles, men's and women's doubles, and men's and women's mixed.
All the winners of the events will receive gold medals. The second place winners will receive silver medals and the loser in the
semifinal will receive a bronze medal. The 1988 International Badminton Association decided to combine the event with the
                                       newly established Sudirman Cup.

men's singles   women's singles   men's doubles   women's doubles   mixed
           (player A)      (player B)       (player C)       (player D)      (player E)
            Denmark         Denmark         Indonesia         Denmark          Japan men's singles   women's singles   men's doubles   women's doubles   mixed
           (player A)      (player B)       (player C)       (player D)      (player E)

men's singles   women's singles   men's doubles   women's doubles
           (player A)      (player B)       (player C)       (player D)
             China           China            China           Thailand men's singles   women's singles   men's doubles   women's doubles   mixed
           (player A)      (player B)       (player C)       (player D)      (player E)
             China           China            China            China           China Time, location, event title, men's singles, women's singles, men's doubles, women's doubles, mixed
              1983 Copenhagen 3 (player A) / (player B) / (player C) / (player D) / (player E)
                                    Indonesia    China
    Time, location, event title, men's singles, women's singles, men's doubles, women's doubles, mixed
              1985 Collide 4 (player A) / (player B) / (player C) / (player D) / (player E)
                                      Korea    Korea
    Time, location, event title, men's singles, women's singles, men's doubles, women's doubles, mixed
              1987 Beijing 5 (player A) / (player B) / (player C) / (player D) / (player E)
                                      China    China
    Time, location, event title, men's singles, women's singles, men's doubles, women's doubles, mixed
              1989 Chakata 6 (player A) / (player B) / (player C) / (player D) / (player E)
                                   China    China   China
```

METHOD AND APPARATUS FOR IMPROVING THE READABILITY OF AN AUTOMATICALLY MACHINE-GENERATED SUMMARY

FIELD OF THE INVENTION

The invention relates to information retrieval, and more specifically, to a method and apparatus for automatically generating a summary for a textual document. In particular, the invention relates to a method and apparatus for improving the readability of an automatically machine-generated summary.

BACKGROUND OF THE INVENTION

In information retrieval, text summarization is widely used, and helps users to quickly evaluate the relevance of documents or to navigate through a corpus. Basically, the text summarization methods can be categorized into the following four approaches: listing the first natural paragraph or a number of sentences at the beginning of an article as a summary (e.g., infoseek, Yahoo!, etc.): this method is very simple, but it cannot give an overview of the article; listing the sentences matched with the search query (Lotus' site, Beijing Daily's site, etc.): this method generate a summary which directly relates to the search query, and it cannot give an overview of the article either; using a template: this method searches for some patterns in a document and fills the matched contents into a pre-defined template. This method can generate a very coherent summary, but it is only applicable to fixed styles and fixed fields, and is difficult to be generalized; identifying the most important clauses/sentences/paragraphs by using statistical techniques. Generally, this method comprises four steps (here we take identifying important sentences for example): (1) analyzing the section and chapter structure of a document and segmenting it into paragraphs and sentences; (2) dividing the sentences into words; (3) evaluating the importance of each of the words and sentences; and (4) outputting the sentences with higher evaluation scores as a summary of the document.

Among the above methods, the statistics based method first extracts representative document segments using statistical techniques, then outputs the representative document segments with higher evaluation scores as the summary of the document. The summary thus generated by this method can better represent the content of the article, and for this reason this method has been widely used.

In most cases, however, sentences with higher evaluation scores are usually scattered in various parts of the document, and may not directly relate to one another, therefore the readability of the summary formed by simply concatenating the sentences with higher evaluation scores is usually relatively poor.

SUMMARY OF THE INVENTION

To improve the readability of an automatically machine-generated summary, according to a first aspect of the invention, there is provided a method of automatically generating a summary for a textual document, including the steps of: segmenting a given textual document to generate document segments, wherein the document segments are words, sentences or paragraphs in the textual document; extracting a number of the document segments to form an initial summary for the textual document; for each of the document segments in the initial summary, calculating the correlation degrees between this document segment and its neighboring document segments, wherein the neighboring document segments of a given document segment refer to those document segments within a predefined distance from the given document segment; and adding the neighboring document segments with higher correlation degrees into the initial summary.

According to a second aspect of the invention, there is provided a method of automatically generating a summary for a textual document, including the steps of: segmenting a given textual document into document segments, wherein the document segments are words, sentences or paragraphs in the textual document; for each of the document segments to be added into the summary, calculating the correlation degrees between this document segment and its neighboring document segments, wherein the neighboring document segments of a given document segment refer to those document segments within a predefined distance from the given document segment; and if there is higher correlation degrees between this document segment and its neighboring document segments, adding this document segment and its neighboring segments into the summary.

According to a third aspect of the invention, there is provided a method for improving the readability of an automatically machine-generated summary, including the steps of: for each of the document segments in an initial summary that has already been generated, calculating the correlation degrees between this document segment and its neighboring documents segments, wherein the document segments are words, sentences or paragraphs in the document, and the neighboring document segments of a given document segment refer to those document segments within a predefined distance from the given document segment; and adding the neighboring document segments with higher correlation degrees into the initial summary.

According to a fourth aspect of the invention, there is provided a apparatus for automatically generating a summary for a textual document, comprising: a segmenting means for segmenting a given textual document into document segments, wherein the document segments are words, sentences or paragraphs in the textual document; a document segment extracting means for extracting document segments that are to form the summary from the document segments generated by the segmenting means; a correlation calculating means for calculating the correlation degrees between the document segments extracted by the document segment extracting means and their neighboring document segments, wherein the neighboring document segments of a given document segment refer to the document segments within a predefined distance from the given document segment; and a coherent summary generating means for combining the document segments extracted by the document extracting means and the neighboring document segments with higher correlation degrees as calculated by the correlation calculating means to generate the summary with improved readability.

According to a fifth aspect of the invention, there is provided a apparatus for improving the readability of an automatically machine-generated summary, comprising: a correlation calculating means for calculating, for each of the document segments in an initial summary that has already been generated, the correlation degrees between this document segment and its neighboring document segments, wherein the document segments are words, sentences or paragraphs in the document, and the neighboring document segments of a given document segment refer to the document segments within a predefined distance from the given document segment; and a coherent summary generating means for adding the document segments with higher correlation degrees as calculated by the correlation calculating means into the initial summary to generate a summary with improved readability.

According to a sixth aspect of the invention, there is provided an Internet portal system, comprising: a subscriber service means for maintaining an Internet website address list for each of the subscribers; an summary automatic generation engine for retrieving information based on predefined conditions from the websites in the Internet website address list, and for extracting a summary to be provided to the subscriber from the retrieved information; and a summary downloading means for downloading the summary generated by the summary automatic generation means to the subscriber in a predefined manner, wherein the summary automatic generation engine comprising: a segmenting means for segmenting a given textual document into document segments wherein the document segments are words, sentences or paragraphs in the textual document; a document segment extracting means for extracting the document segments that are to form the summary from the document segments generated by the segmenting means; a correlation calculating means for calculating the correlation degrees between the document segments extracted by the document extracting means and their neighboring document segments, wherein the neighboring document segments of a given document segment refer to the document segments within a predefined distance from the given document segment; and a coherent summary generating means for combining the document segments extracted by the document extracting means and the neighboring document segments with higher correlation degrees as calculated by the correlation calculating means, to generate a summary with improved readability.

According to a seventh aspect of the invention, there is provided an electronic document browser, comprising: an electronic document browsing unit for searching, locating and fetching an electronic document that a user wants to browse, and for selecting a number of document segments from the electronic document to be provided to the user for browsing, wherein the document segments are words, sentences or paragraphs in the document; and a readability improvement means, comprising: a correlation calculating means for calculating, for each of the document segments selected by the electronic document browsing unit, the correlation degrees between this document segment and its neighboring document segments, wherein the neighboring document segments of a given document segment refer to the document segments within a predefined distance from the given document segment; and a coherent document segments generating means for combining the document segments selected by the electronic document browsing unit and the neighboring document segments with higher correlation degrees as calculated by the correlation calculating means, to generate information with improved readability for the user's browsing.

In the method and apparatus for automatically generating a summary for a textual document, the method and apparatus for improving the readability of an automatically machine-generated summary, the Internet portal system and the electronic document browser implementing the above methods and apparatus in accordance with the invention, the correlation degrees between a document segment and its neighboring document segments are considered, and the neighboring document segments with higher correlation degrees are added into the summary, thus improving the readability of the automatically machine-generated summary.

BRIEF DESCRIPTION OF THE DRAWINGS

FIGS. 3A and 3B show respectively the summaries generated by means of a prior art method and by means of a method of the invention;

DETAILED DESCRIPTION

Various preferred embodiments of the invention will be described below by referring to the accompanying drawings.

Figure 1:
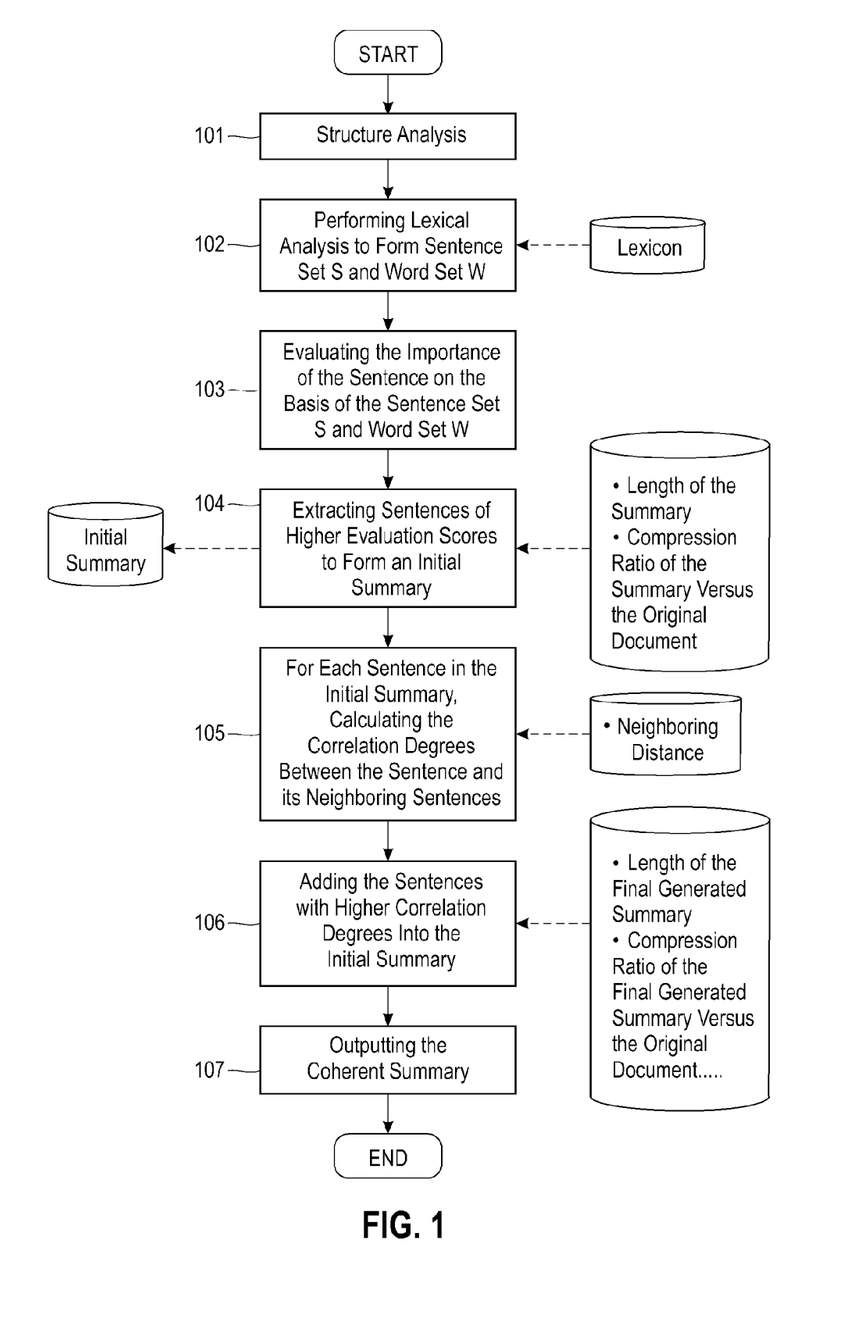
FIG. 1 is a flow chart illustrating the method of automatically generating a summary for a textual document according to an embodiment of the invention.

FIG. 1 is a flow chart illustrating the method of automatically generating a summary for a textual document according to an embodiment of the invention. As shown in FIG. 1, a method of automatically generating a summary for a textual document according to an embodiment of the invention is as follows:

Initially, in step 101, structure analysis is performed on the document, and the title, sections, paragraph boundaries, sentence boundaries, etc are identified.

In step 102, lexical analysis is performed on each sentence in the document according to the language type of the document.

A sentence set S and a word set W are formed through the above said section and chapter structure analysis and lexical analysis, to prepare for the evaluation on the importance of sentences to be performed in step 103.

In step 103, each sentence in the document is evaluated on the basis of the sentence set S and the word set W formed in steps 101 and 102, to determine their importance. To do this, first the score of each word is calculated. When the score of the each word is calculated, the following factors, for example, may be considered: the relevance with the query or topic submitted by the user, the correlation degrees with the words in the document's title, the number of its occurrences in the document, etc., and the score of the word may be a weighted sum of these factors. Then, the score of the each sentence is calculated based on the scores of the words. In calculating the score of the sentence, in addition to the sum of scores of all the words in the sentence, the following factors, for example, may also be taken into account: the location of the sentence in the paragraph, chapter and section, wherein the first sentence in a paragraph, chapter or section may get a higher score than the sentences in other locations; and the similarity among sentences, wherein if the sentences similar in content to a given sentence occur multiply times in the document, the given sentence gets a higher score.

In step 104, based on the evaluation on each sentence of step 103, the sentences with higher evaluation scores are extracted to form an initial summary. As shown in the figure, in forming the initial summary, the following parameters can be used to control how many sentences with higher evaluation scores are to be extracted specifically: the length of the summary, or the compression ratio of the summary versus the original document. The above parameters may have values set by an user, or default values of the system. Whether the user (system) selects the parameter "length of the summary" or the parameter "compression ratio of the summary versus the original document", it can be controlled as to how many sentences with higher evaluation scores are to be extracted specifically to form the initial summary. But, if the user selects the parameter "length of the summary", the summary will be of a fixed length for each document, whereas if the user selects the parameter "compression ratio of the summary versus the original document", the summary will be of a variable length for each document.

In step 105, for each sentence in the initial summary, the correlation degrees between this sentence and its neighboring sentences are calculated.

The commonly used calculations of sentence correlation degrees are generally divided into two levels: the correlation degree on syntactic level and the correlation degree on semantic level.

The correlation degree on syntactic level: determining whether two sentences are similar according to the similarity between their syntactic structures. This method performs syntactic analysis on the sentences, then represents the analysis result in the form of a framework or a dependency tree, and performs the correlation degree calculation on this basis. Although the correlation degree calculated by this method is quite accurate, the research on the syntactic analysis on a large corpus has not yet come to maturity, and thus this technique has not yet been widely used.

The correlation degree on semantic level: determining the semantic similarity. This is done by computing distances between terms in the two sentences according to a lexicon or semantic thesaurus. This method determines the sentence correlation degrees mainly through determining correlation degrees among words forming the sentences.

An important way for measuring the correlation relationship between two words is the distance therebetween.

Generally, a word distance is a real number in $[0, \infty]$.

The distance between a word and itself is 0.

The word distance is closely associated with the word correlation degree.

The greater the distance between two words is, the lower their correlation degree will be; contrarily, the smaller the distance between two words is, the higher their correlation degree will be. A simple correspondence relationship can be established between the two, which meets the following several conditions:

if the distance between two words is 0, their correlation degree is 1;

if the distance between two words is infinite, their correlation degree is 0;

the greater the distance between two words is, the lower their correlation degree will be (monotonously decreasing).

For two words $W_1$ and $W_2$, if their correlation degree is denoted as $Sim(W_1, W_2)$, and their word distance as $Dis(W_1, W_2)$, a simple transformation relation meeting the above conditions can be defined as follows:

$$Sim(W_1, W_2) = \frac{\alpha}{Dis(W_1, W_2) + \alpha} \quad (1)$$

wherein $\alpha$ is an adjustable parameter. The sense of $\alpha$ is the value of the word distance when the correlation degree is 0.5.

Such a transformation relation is not unique, and here is provided only one of the possibilities.

In many cases, it is quite difficult to directly calculate the word correlation degree, thus it is usual to first calculate the word distance, and then to transform it into the word correlation degree.

A usual method of calculating the word distance is based on some kind of ontology.

An ontology based method of calculating word' semantic distance generally depends on a semantic thesaurus. A common semantic thesaurus usually has all its words organized into a hierarchy of one or more trees. As we know, in a tree graph, there is one and only one path between any two nodes. Thus, the length of this path can be taken as a measurement of the semantic distance between these two words.

Besides the method of first calculating the word distance and then transforming it into the word correlation degree, another method of calculating the word correlation degree is based on the statistical analysis on a large corpus. For example, the word relevance can be used to calculate the word correlation degree. By selecting a set of words in advance and treating them as features in a vector space and then representing each word by a feature vector (generally measured by the frequency of this set of characteristic words occurring in the context of this word in a large practical corpus), after that, the correlation degrees among these vectors (usually calculated as the cosine of the angle between the two vectors) can be used as the word correlation degrees. This approach is based on the assumption that for words with similar semantics, their contexts should also be similar.

After the word correlation degrees in two sentences have been determined, based on them, the sentence correlation degrees can be determined.

For example, the sentence correlation degree can be determined according to the following formula:

$$R(S_i, S_j) = \sum_k w_k(S_i, S_j) / \text{Max}(wkn(S_i), wkn(S_j))$$

wherein, $R(S_i, S_j)$ represents the correlation degree between sentences $S_i$ and $S_j$, $w_k(S_i, S_j)$ represents the correlation degree between the kth correlated words in sentences $S_i$ and $S_j$, wkn(.) represents the sum of the weights of all words in a sentence.

In calculating, for each sentence in an initial summary, the correlation degrees between this sentence and its neighboring sentences, another problem needing to be considered is the neighborhood distance. Generally, the neighboring sentence of a given sentence refers to the sentence directly before or after the given sentence. In some cases, however, a sentence is in close relation with a sentence that indirectly neighboring it, and then, in such cases, a neighborhood distance N (N is a positive integer greater than or equal to 1) need to be defined. For example, if the neighborhood distance N is set as 3, the correlation degrees between a sentence and the 3 sentences before and after it respectively will be calculated. If, within this neighborhood distance, the correlation degree between the sentence and one of its indirectly neighboring sentences before or after it is higher, this indirectly neighboring sentence with a higher correlation degree and the sentences between them will be added into the initial summary in the next step, to improve the readability of the initial summary. Obviously, in case of the neighborhood distance N equal to 1, it is to calculate the correlation degree between a given sentence and a sentence directly before or after it.

In step 106, sentences with higher correlation degrees are added into the initial summary to form a final coherent summary. As show in the figure, the finally generated coherent summary may be controlled by means of one or more of the following parameters: the length of the finally generated coherent summary; the compression ratio of the finally generated coherent summary versus the original document; or the percentage of sentences with higher correlation degrees in the finally generated coherent summary, etc. The above parameters can have values set by the user, or default values of the system. If the user wants to further improve the readability of the finally generated summary, he can increase the following parameters: the length of the finally generated coherent summary; the compression ratio of the finally generated coherent summary versus the original document; or the percentage of sentences with higher correlation degrees in the finally generated coherent summary. If the user wants to make the finally generated summary more compact, he can decrease the following parameters: the length of the finally generated coherent summary; the compression ratio of the finally generated coherent summary versus the original document; or the percentage of sentences with higher correlation degrees in the finally generated coherent summary.

A method of automatically generating a summary for a textual document according to an embodiment of the invention has been explained above by referring to FIG. 1. In this method, because the correlation degrees between a document segment and its neighboring sentences are considered, and the neighboring sentences with higher correlation degrees are added into the initial summary, the readability of the automatically machine-generated summary is improved.

In the above embodiment, the structure analysis and lexical analysis are performed on the document to generate a sentence set S and a word set W, each sentence in the document is evaluated on the basis of the sentence set S and the word set W to determine its importance, and the sentences with higher evaluation scores are extracted to form the initial summary. Moreover, the relevance of these sentences with the query or topic submitted by the user is also taken into consideration in the determination of the importance of the sentences. However, all these specific details are merely for the purpose of the invention being better understood, and may not be construed as limitations to the invention. It is obvious for the persons of ordinary skills in the art that, the method of the invention can have many variants. For example, in case of a novel, its summary should be a number of relatively important paragraphs therein, and the neighboring paragraphs with higher correlation degrees may be added into the initial summary to improve the readability of the automatically machine-generated summary. Whereas, for a short essay containing only several sentences, its summary should comprise the important words therein. And, the words with higher correlation degrees can be added into the initial summary to improve the readability of the automatically machine-generated summary. In addition, the above mentioned calculations of the word correlation degrees and the calculation of the sentence correlation degrees based on the word correlation degrees can be easily extended to the calculation of the paragraph correlation degrees.

Therefore, as noted above, the present method of automatically generating a summary for a textual document can improve the readability of an automatically machine-generated summary by segmenting the given textual document; extracting some document segments to form an initial summary for the textual document; for each document segment in the initial summary, calculating the correlation degrees between this document segment and its neighboring document segments; and adding the neighboring document segments with higher correlation degrees into the initial summary. Depending on different applications, the document segments can be words, sentences or paragraphs in the textual document respectively. Moreover, the methods of forming the initial summary are not limited to those described in detail in the above embodiment.

Although it has been described how to form an initial summary as a part of a complete method of automatically generating a summary for a textual document in the embodiment as shown in FIG. 1, it is possible to apply only the steps starting from step 105 in FIG. 1 to improve the readability of a summary generated by a existing summary automatic generation system. Therefore, the invention also provides a method of improving the readability of an automatically machine-generated summary, comprising the steps of: calculating, for each document segment in an initial summary that has already been generated, the correlation degrees between this document segment and its neighboring document segments; and adding the neighboring document segments with higher correlation degrees into the initial summary.

Figure 2:
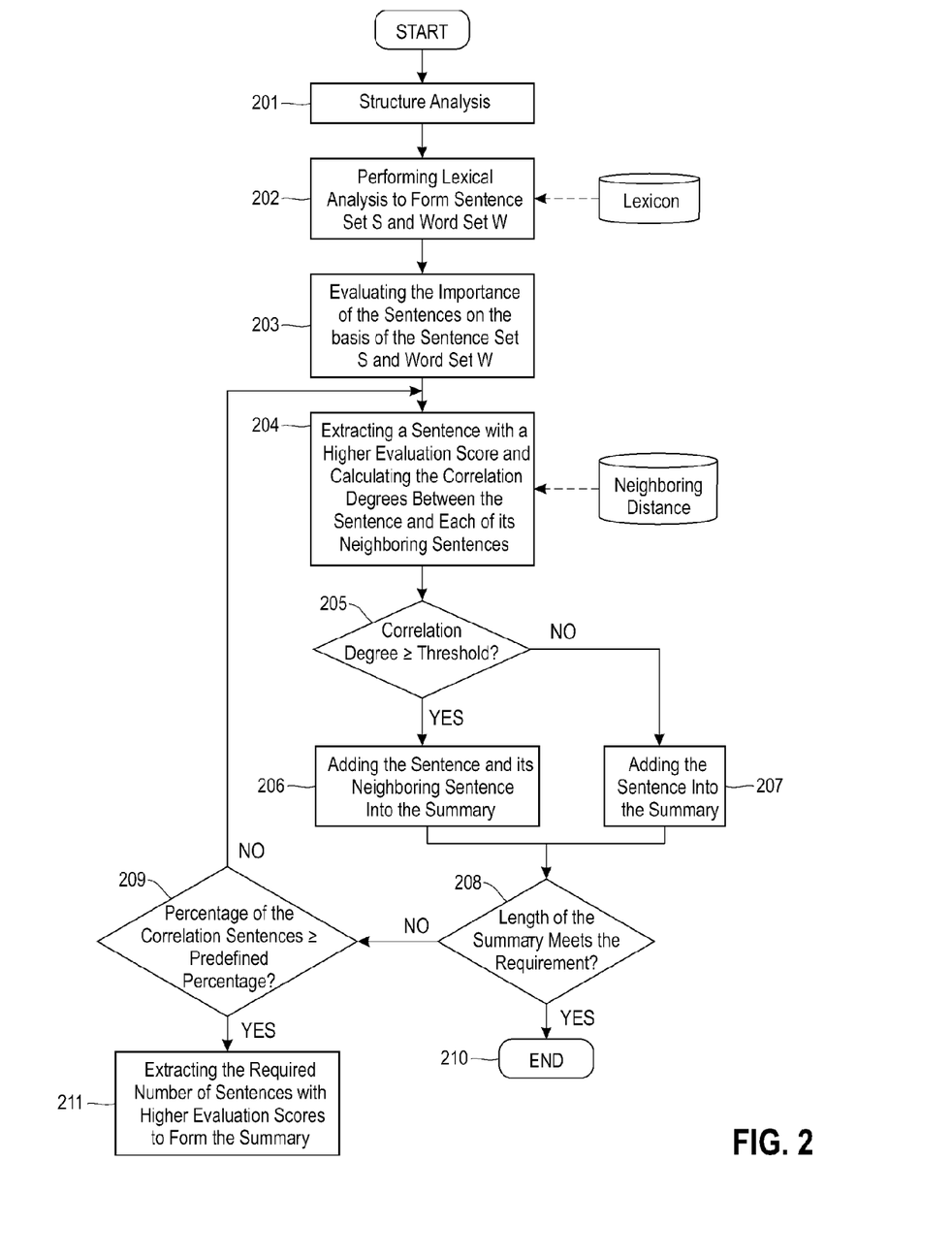
FIG. 2 is a flow chart illustrating the method of automatically generating a summary for a textual document according to another embodiment of the invention.

FIG. 2 is a flow chart illustrating the method of automatically generating a summary for a textual document according to another embodiment of the invention. The embodiment of FIG. 2 differs from that of FIG. 1 in that in the embodiment of FIG. 2, the initial summary is not formed after the evaluation on the importance of the sentences (step 203). Instead, at the same time that a sentence with a higher score is extracted, the correlation degrees between this sentence and its neighboring sentences are calculated (step 204). If a correlation degree is above a threshold (step 205), this sentence and its neighboring sentence will be added together into the summary (step 206), which is initially empty. If not, only this sentence will be added into the summary (step 207). Then, a determination is made as to whether the length of the summary meets the requirement (step 208), that is, to determine whether the length of the summary meets the requirement according to the values of the parameters such as the length of the finally generated coherent summary or the compression ratio of the finally generated coherent summary versus the original document, as set by the user or the system's default. If the requirement is met, the method ends (step 210). If not, a determination is made as to whether the percentage of sentences with higher correlation degrees in the current summary is greater than or equal to the percentage of sentences with higher correlation degrees in the finally generated summary as set by the user (or the system's default) (step 209). If the result of the determination is "no", the method returns to step 204. If the result of the determination is "yes", only the required number of sentences with higher evaluation scores are extracted to form the final summary (step 211).

In the above embodiment, when it is determined in step 208 that the length of the current summary has not met the requirement, but it is determined in step 209 that the percentage of sentences with higher correlation degrees in the current summary is greater than or equal to the percentage of sentences with higher correlation degrees in the finally generated summary as set by the user (or the system's default), only a required number of sentences with higher evaluation scores are simply extracted to form the final summary. In addition, it is also possible, while extracting the next sentence $W_j$ with a higher evaluation score, to calculate the correlation degree between the sentence $W_j$ and its neighboring sentence, and to determine whether this correlation degree is greater than the correlation degree between a certain sentence (e.g., sentence $W_i$) in the current summary and its neighboring sentence, and if "yes", the neighboring sentence with lower correlation degree is removed from the current summary, and the sentence $W_j$ and its neighboring sentence are added into the summary. This step is repeated until the length of the current summary meets the requirement.

FIGS. 3A and 3B show respectively the summary generated by means of a prior art method and the summary generated by means of a method of the invention. As shown clearly by the examples in the figures, since in the method of the present invention the correlation degrees between a sentence and its neighboring sentences are taken into account, and the neighboring sentences with higher correlation degrees are added into the initial summary, the readability of the automatically machine-generated summary is improved.

Figure 4:
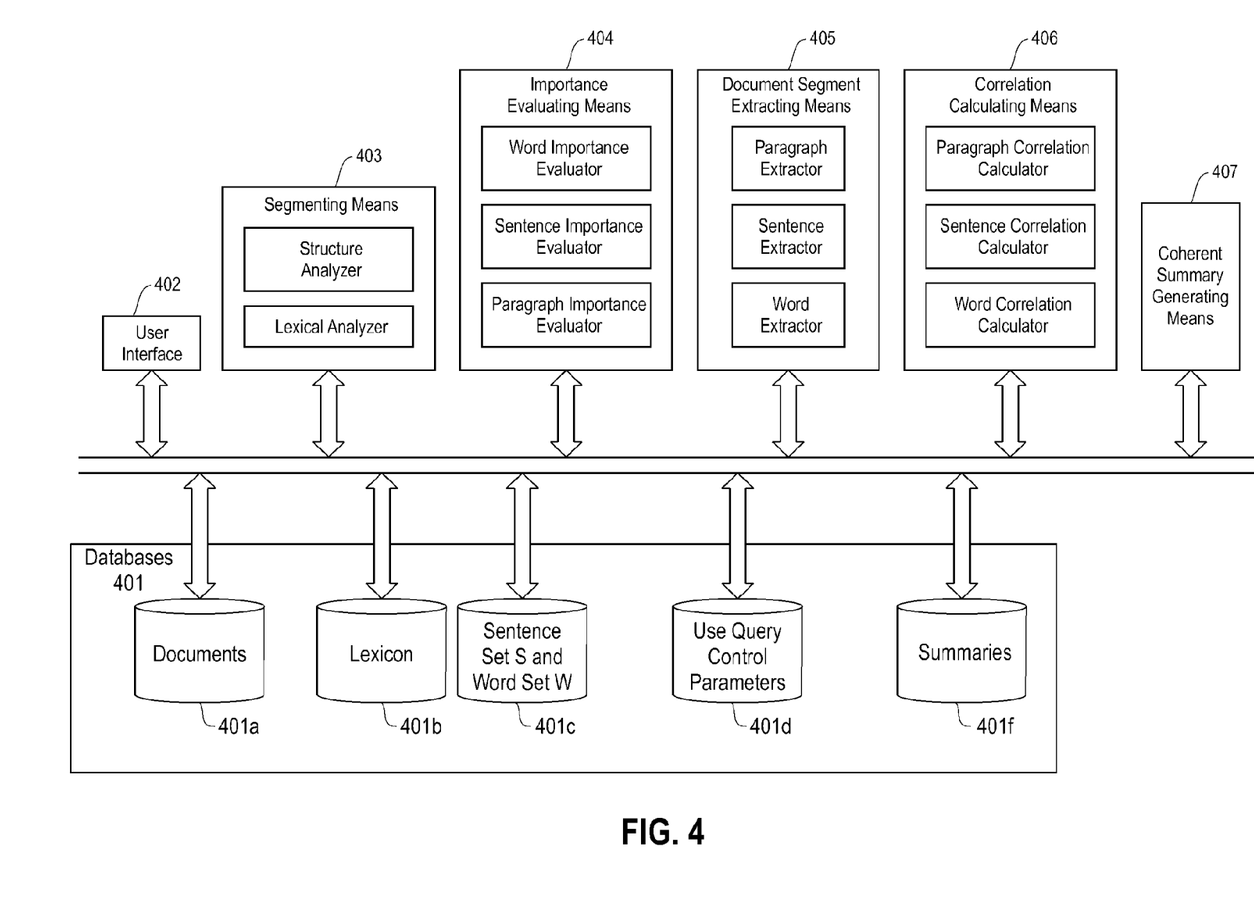
FIG. 4 is a block diagram illustrating the apparatus for automatically generating a summary for a textual document according to an embodiment of the invention.

FIG. 4 is a block diagram illustrating the apparatus 400 for automatically generating a summary for a textual document according to an embodiment of the invention. As show in FIG. 4, the apparatus comprises databases 401, an user interface 402, a segmenting means 403, an importance evaluating means 404, a document segment extracting means 405, a correlation calculating means 406 and a coherent summary generating means 407.

Among them, the user can input the queries or the topics in which the user is interested through the user interface 402, and can also set the following parameters through this interface: taking a word as a document segment, taking a sentence as a document segment, taking a paragraph as a document segment, the neighborhood distance, the length of the initial summary, the length of the finally generated summary, the compression ratio of the initial summary versus the original textual document, the compression ratio of the finally generated summary versus the original textual document, and the percentage of the neighboring document segments with higher correlation degrees in the finally generated summary. The queries/topics or the above control parameters input by the user through this interface are stored in database 401d.

The segmenting means 403, comprising a structure analyzer and a lexical analyzer, is used to perform the section and chapter structure analysis on the document, to identify the title, sections, paragraph boundaries, sentence boundaries, etc., and to perform lexical analysis on each sentence in the document according to the language type of the document, in order to form a sentence set S and a word set W, and to store the resulting sentence set S and word set W into database 401c to prepare for the importance evaluation by the importance evaluating means 404. In the method for automatically generating a summary for a textual document according to an embodiment of the invention as described with reference to FIG. 1, the structure analysis and lexical analysis have been described in detail, and so the explanation on them is omitted here.

The importance evaluating means 404 comprises a word importance evaluator, a sentence importance evaluator and a paragraph importance evaluator. Among them, the word importance evaluator calculates a score for each word in the word set W based on the correlation degree between this word and the query or topic submitted by the user, the correlation degrees between this word and the words in the document's title, the number of occurrences of this word in the document, etc. Then, the sentence importance evaluator calculates a score for a sentence based on the scores of words. In calculating the score of the sentence, in addition to the sum of scores of all the words in the sentence, the following factors, for example, may also be taken into account: the location of the sentence in the paragraph, chapter and section, wherein the first sentence in a paragraph, chapter or section may get a higher score than sentences in other locations; and the similarity among sentences, wherein if the sentences similar in content to a given sentence occur multiple times in the document, the given sentence may get a higher score. The paragraph importance evaluator calculates a score for each paragraph according to its location and the scores of the sentences in the paragraph. After the processing of the importance evaluating means 404, each of paragraphs, sentences and words has a respective evaluation score.

The document segment extracting means 405 includes a paragraph extractor, a sentence extractor and a word extractor for extracting the paragraphs, sentences or words of more importance respectively to form the summary.

The correlation calculating means 406 comprises a paragraph correlation calculator, a sentence correlation calculator and a word correlation calculator for calculating respectively the correlation degrees between a paragraph, sentence or word of more importance extracted respectively by the paragraph extractor, sentence extractor and word extractor in the document segment extracting means 405, and their respective neighboring paragraphs, sentences and words. In the method for automatically generating a summary of a textual document according to an embodiment of the invention as described with reference to FIG. 1, it has been described in detail how to calculate the word correlation degree as well as how to calculate the sentences correlation degree based on the word correlation degree, and for those of ordinary skills in the art, it is very easy to calculate the paragraph correlation degree based on the above calculations, therefore the explanation on it is omitted here.

The coherent summary generating means 407 combines the paragraphs, sentences or words extracted by the document segment extracting means 405 and the neighboring paragraphs, sentences or words with higher correlation degrees as calculated by the correlation calculating means 406, to generate the summary with improved readability.

In the above embodiment, the segmenting means 403, importance evaluating means 404, document segment extracting means 405, correlation calculating means 406 and coherent summary generating means 407 determine whether the summary is generated in the unit of a word, a sentence or a paragraph according to the parameters, taking a word as a document segment, taking a sentence as a document segment, taking a paragraph as document segment, as input by the user (through the user interface 402) or the system's default. For example, if the parameter input by the user is "taking sentences as document segments", the segmenting means, importance evaluating means, document segment extracting means, correlation calculating means and coherent summary generating means all perform their respective processes in the unit of a sentence to generate the summary. Furthermore, the correlation calculating means 406 determines the range of the neighboring paragraphs, sentences or words to be extracted in the correlation degree calculation according to the parameter, the neighborhood distance, as input by the user or the system's default. The coherent summary generating means 407, according to the parameters, the length of the initial summary, the length of the finally generated summary, the compression ratio of the initial summary versus the original textual document, the compression ratio of the finally generated summary versus the original textual document, and the percentage of the neighboring document segments with higher correlation degrees in the finally generated summary, as input by the user or the system's default, combines the paragraphs, sentences or words extracted by the document segment extracting means and the paragraphs, sentences or words with higher correlation degrees as calculated by the correlation calculating means to generate the summary meeting the user's requirements in terms of length or relevant ratios.

Although in the embodiment as shown in FIG. 4, as an embodiment according to the invention, a complete apparatus for automatically generating a summary for a textual document has been described, it is possible to improve the readability of a summary generated by an existing summary automatic generation system by using the correlation calculating means 406 and the coherent summary generating means 407 in the apparatus. Therefore, the invention also provides an apparatus for improving the readability of an automatically machine-generated summary.

Figure 5:
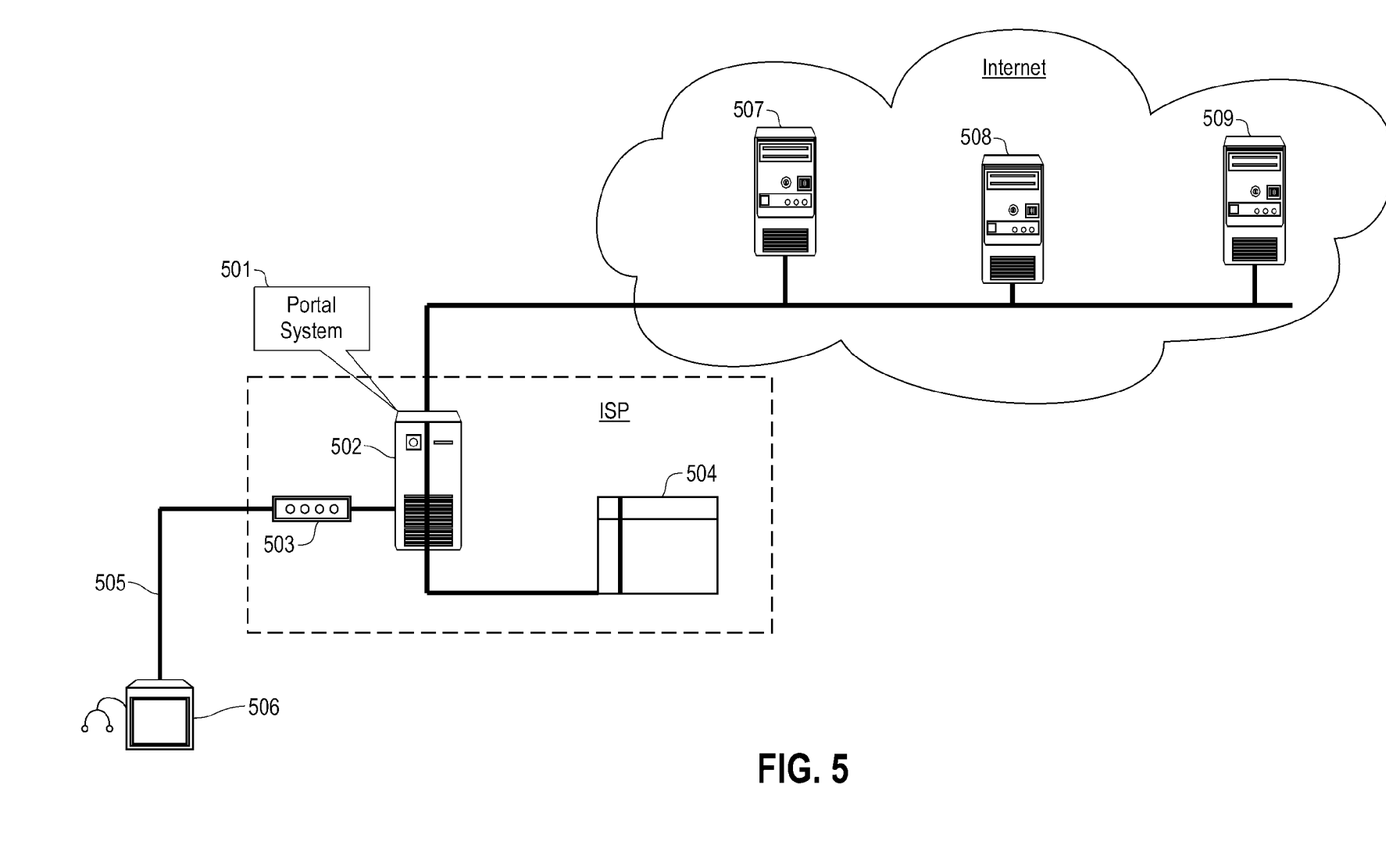
FIG. 5 shows an overview of the Internet portal system according to an embodiment of the invention.
Figure 7:
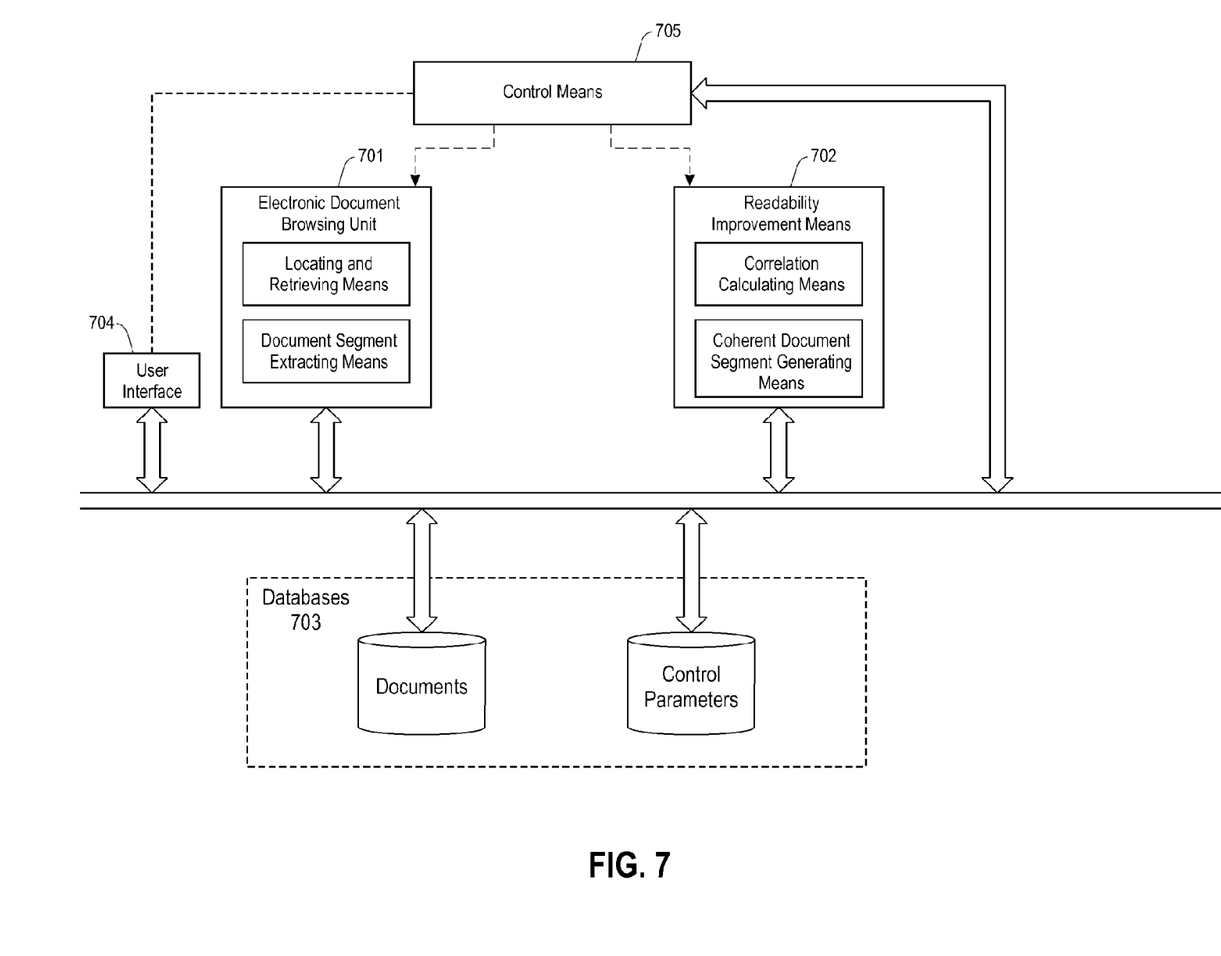
FIG. 7 is a block diagram of the components of the electronic document browser according to an embodiment of the invention.
Figure 8A:
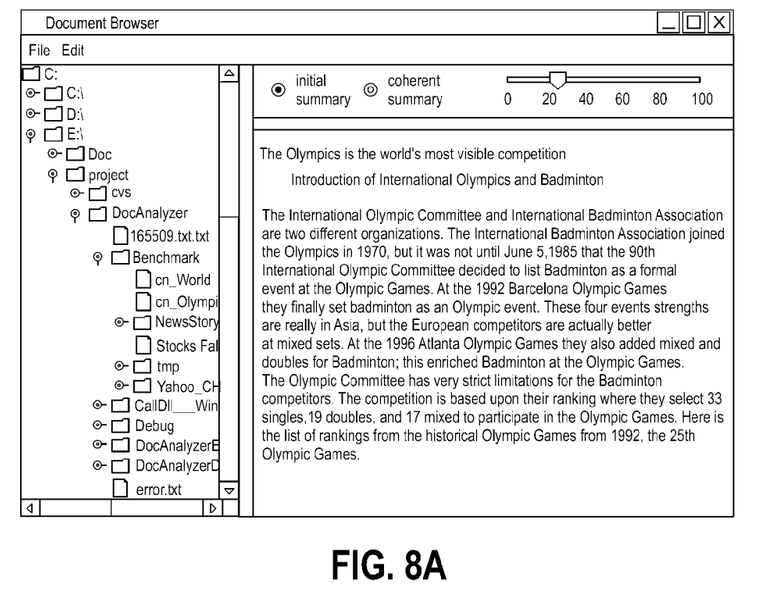
FIGS. 8A and 8B show the user interface of the electronic document browser as shown in FIG. 7.
Figure 8B:
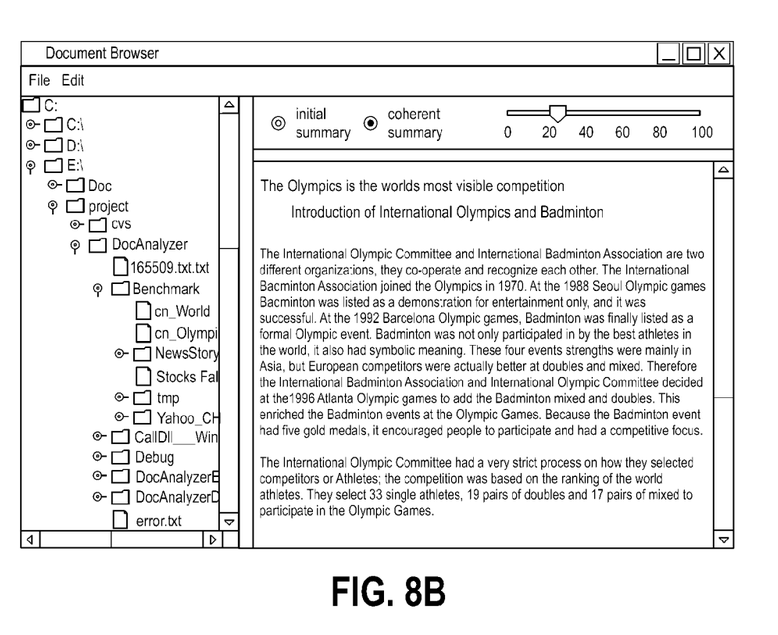

A method and apparatus for automatically generating a summary for a textual document and a method and apparatus for improving the readability of an automatically machine-generated summary according to specific embodiments of the invention have been described above in connection with the accompanying drawings. The above described apparatus and methods may have many relevant applications. FIG. 5 shows a schema of the Internet portal system according to an embodiment of the invention, wherein the Internet portal system implements the apparatus or methods as described above to improve the readability of a summary. FIGS. 7 and 8 show an electronic document browser implementing the above described apparatus or methods. A person of ordinary skills in the art will understand that, besides the above two particular applications, the method and apparatus of the invention for automatically generating a summary for a textual document can have many other relevant applications. For the invention being better understood, the Internet portal system and the electronic document browser according to a specific embodiment of the invention will be described below with reference to the accompanying drawings.

FIG. 5 shows an overview of the Internet portal system according to an embodiment of the invention. In the embodiment shown FIG. 5, the Internet portal system 501 runs on a server 502 of an ISP (Internet service provider) and provides information retrieval service to Internet subscribers, including providing the desired summary information to the subscribers according to their requirements. Internet is the preferred application of the invention, but the invention is not limited to this, because it can also be applied to other networks.

In this embodiment, the ISP contains a server 502, a modem pool 503 (shown as a modem here) and a mass storage 504 for storing data. As shown in the figure, the ISP is coupled to Internet. Here, other apparatus present in the ISP and coupled to Internet, such IP routers, data switches, gateways, etc., which are known in the art, are not shown. As known in the art, a subscriber accesses the Internet portal system 501 by using a subscriber name and a password through the subscriber operation means 506, and the Internet portal system 501 provides personalized web pages to the subscriber by visiting various web sites (e.g., the three Internet server shown in the figure) on Internet.

Figure 6:
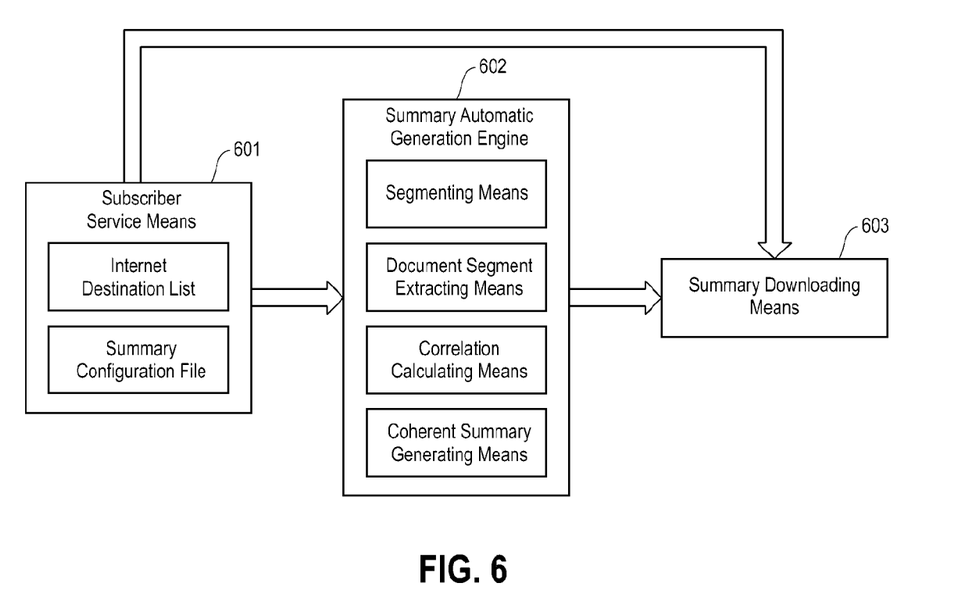
FIG. 6 is a block diagram of the Internet portal system of FIG. 5.

The components of the Internet portal system as shown in FIG. 5 will be described with reference to FIG. 6. As shown in FIG. 6, this Internet portal system comprises: a subscriber service means 601, a summary automatic generation engine 602 and a summary downloading means 603. Among them, the subscriber service means 601 maintains an Internet website address list for each subscriber wherein the subscriber wishes to get the desired information from the Internet websites in the Internet website address list. The summary automatic generation engine 602 is used to retrieve information based on predefined conditions by visiting the Internet websites in the Internet website address list, and to extract a summary to be provided to the subscriber from the retrieved information. The summary downloading means 603 is used to download the summary generated by the summary automatic generation engine to the subscriber in a predefined manner. Among them, the summary automatic generation engine 602 comprises: a segmenting means for segmenting a given textual document into document segments; a document segment extracting means for extracting document segments that are to form the summary from the document segments generated by the segmenting means; a correlation calculating means for calculating the correlation degrees between the document segments extracted by the document extracting means and their neighboring document segments; and a coherent summary generating means for combining the document segments extracted by the document extracting means and the neighboring document segments with higher correlation degrees as calculated by the correlation calculating means, to generate the summary with improved readability. The subscriber can specify the manner of downloading the summary through a client user interface. For example, the subscriber may choose one of the following manners: immediate downloading, periodic downloading, or downloading on demand. The subscriber service means 601 stores the downloading manner chosen by the subscriber in a summary configuration file maintained for each subscriber, and the summary downloading means 603 downloads the summary generated by the summary automatic generation engine 602 to the subscriber either immediately, periodically, or on demand according to this summary configuration file. Furthermore, the subscriber can also specify the following parameters through the client user interface: the fields, topics and words in which the subscriber is interested. The subscriber service means 601 also stores these contents in the summary configuration file maintained for each subscriber. Thus, the summary automatic generation engine 602 can provide the required summary information to the subscriber according to the fields, topics and words in which the subscriber is interested. In the embodiment, the subscriber can also specify the following parameters through the client user interface: taking a word as a segment, taking a sentence as a segment, taking a paragraph as a segment, the neighborhood distance, the length of the initial summary, the length of the finally generated summary, the compression ratio of the initial summary versus the original textual document, the compression ratio of the finally generated summary versus the original textual document, and the percentage of the neighboring document segments with higher correlation degrees in the finally generated summary. The subscriber service means 601 also stores these parameters in the summary configuration file maintained for each subscriber. Thus, the summary automatic generation engine 602 can provide the required summary information to the subscriber according to his requirements.

FIGS. 7 and 8 show the application of another aspect of the invention: an electronic document browser.

As shown in FIG. 7, the electronic document browser according to an embodiment of the invention comprises: an electronic document browsing unit 701, a readability improvement means 702, databases 703, an user interface 704 and a control means 705. Among them, the electronic document browsing unit 701 includes a locating and retrieving means for searching, locating and fetching an electronic document which a user wants to browse; and a document segment extracting means for selecting a number of document segments from the electronic document to be provided to the user for browsing. The readability improvement means 702 comprises a correlation calculating means for calculating, for each document segment that has been selected by the electronic document browsing unit, the correlation degrees between this document segment and its neighboring document segments; and a coherent document segment generating means for combining the document segments selected by the electronic document browsing unit and the neighboring document segments with higher correlation degrees as calculated by the correlation calculating means, to generate the information with improved readability for the user's browsing. Databases 703 are used to store electronic documents to be browsed by the user and various control parameters. The user interface 704 can be used by the user to input various control parameters and to browse the electronic documents. The control means 705 is used to control every component of the entire browser according to the control parameters set by the user through a user interface, or default parameters of the system.

FIGS. 8A and 8B show a user interface of the electronic document browser shown in FIG. 7. By using buttons on top of the screen, the user can control whether to add a number of document segments (e.g., sentences) with higher correlation degrees into the current summary to improve its readability, and control the percentage of the document segments (e.g., sentences) with higher correlation degrees in the whole summary.

According to the embodiment, the readability improvement means 702 can be used together with a general purpose browser (e.g., IE, Acrobat Reader etc.) used by readers to browse electronic documents, or in other words, the general purpose browsers can be integrated together with the readability improvement means 702 of the invention (e.g., in the form of plug-ins), thereby improving the readability of information to be browsed.

Although a method and apparatus for automatically generating a summary for a textual document, a method and apparatus for improving the readability of an automatically machine-generated summary, and an Internet portal system and electronic document browser implementing the above said methods and apparatus according to the invention have been described in detail through some specific embodiments of the invention, the above embodiments are not intended to be exhaustive, and those skilled in the art can implement various variations and modifications without apart from the spirit and scope of the invention. Therefore, the invention is not limited to these embodiments, but rather the scope of the invention is solely defined by the attached claims.

What is claimed is:

1. A method of automatically generating a summary for a textual document, comprising:
   receiving a segment type indicator from a user destined to receive an automatically generated summary, the segment type indicator indicating whether to segment a given textual document into one of word segments, sentence segments, and paragraph segments;
   segmenting the given textual document into a plurality of document segments based on the segment type indicator received from the user, wherein the document segments are one of words, sentences and paragraphs in the given textual document;
   extracting a number of document segments from the plurality of document segments to form an initial summary of the given textual document;
   for each document segment in the initial summary, calculating a set of correlation degrees between this document segment and its neighboring document segments that are outside of the initial summary, wherein the neighboring document segments of a given document segment refer to the document segments within a predefined distance from the given document segment;
   adding the neighboring document segments with higher correlation degrees into the initial summary of the given textual document; and
   creating a final summary of the given textual document that is to be displayed to the user based on the initial summary and the neighboring document segments that have been added to the initial summary.

2. The method of claim 1, wherein the extracting a number of document segments from the plurality of document segments to form an initial summary comprises forming an initial summary by:
   identifying the document segments to be included in the initial summary;
   identifying one or more neighboring document segments associated with each of the document segments
   adding each of the document segments which have been identified to the initial summary; and
   adding the neighboring document segments which have been identified to the initial summary.

3. The method of claim 2, wherein the forming of an initial summary further comprises:
   identifying a document segment as a word, a sentence, or a paragraph.

4. The method of claim 2, wherein the forming of an initial summary further comprises:
   defining a neighborhood distance to be utilized in identifying the neighboring document segments.

5. The method of claim 2, wherein the forming of an initial summary further comprises:
   defining the initial summary length, defining a compression ratio of the initial summary versus the given textual document;
   defining the length of the final summary;
   defining the compression ratio of the final summary-versus the given textual document; and
   defining a percentage of the neighboring document segments with higher correlation degrees in the final summary.

6. The method of claim 2, wherein if the document segment is a sentence, the correlation degree between this sentence and its neighboring sentence is determined based on the correlation degrees between the words in this sentence and the words in its neighboring sentence.

7. The method of claim 6, wherein the correlation degree between two words is determined based on the distance between the two words.

8. The method of claim 6, wherein the distance between two words is calculated according to a certain ontology.

9. The method of claim 6, wherein the correlation degree between two words is determined based on statistics using a large corpus.

10. The method of claim 1, wherein adding the neighboring document segments with higher correlation degrees into the initial summary of the given textual document further comprises:
    determining that at least one of the neighboring document segments is an indirect neighbor, wherein at least one other document segment is disposed between the document segment in the initial summary and the indirect neighbor; and adding the at least one neighboring document segment that is an indirect neighbor and the at least one other document segment disposed between the document segment in the initial summary and the indirect neighbor to the initial summary.

11. A method of improving a readability of an automatically machine-generated summary, including:
    identifying each document segment generated as part of an initial summary of a given textual document;
    calculating a correlation degree between each of the document segments which has been identified within initial summary and each of their respective neighboring document segments that are outside of the initial summary;
    adding the neighboring document segments with a correlation degree above defined threshold, to the initial summary of the given textual document; and
    creating a final summary of the given textual document based on the initial summary and the neighboring document segments that have been added to the initial summary.

12. The method of claim 11, wherein the document segment is a word, sentence or paragraph in the textual document.

13. The method of claim 11, wherein the neighboring document segments of a given document segment refer to the document segments within a predefined distance from the given document segment, wherein the predefined distance is a neighborhood distance.

14. The method of claim 11 further comprises:
    setting by a user one or more of the following parameters:
        a neighborhood distance;
        a length of the initial summary which has been finally generated;
        a compression ratio of the final summary versus a given textual document; and
        a percentage of the document segments which are neighboring with higher correlation degrees in a final summary of the initial summary.

15. The method of claim 11, wherein if the document segment is a sentence, the correlation degree between the sentence and a neighboring sentence is determined based on the correlation degrees between words in the sentence and words in the neighboring sentence.

16. A method of automatically generating a summary for a textual document, comprising:
    receiving a segment type indicator from a user destined to receive an automatically generated summary, the segment type indicator indicates whether to segment a given textual document into one of sentence segments and paragraph segments;
    segmenting the given textual document into a plurality document segments based on the segment type indicator received from the user, wherein the document segments are one of sentences and paragraphs in the given textual document;
    identifying each word of each sentence in each document segment;
    calculating a score for each word based on at least one of:
        a relevance to a query submitted by the user;
        a set of correlation degrees with words in a title of the given textual document; and
        a total number of occurrences of the word in the given textual document;
    calculating a score of each sentence in each document segment based on a score associated with each word in the sentence and at least one of:
        a location of the sentence in at least one of a paragraph, chapter, and section of the given textual document; and
        a total number of occurrences of at least one sentence comprising substantially similar content in the given textual document;
    extracting a set of sentences from the plurality of document segments based on the score associated with each sentence;
    forming an initial summary of the given textual document comprising the set of sentences that have been extracted;
    for each sentence in the initial summary, calculating a set of correlation degrees between this sentence and its neighboring sentences that are outside of the initial summary, wherein the neighboring sentences of a given sentence refer to sentences within a predefined distance from the given sentence;
    adding the neighboring sentences with higher correlation degrees into the initial summary of the given textual document; and
    creating a final summary of the given textual document based on the initial summary and the neighboring sentences that have been added to the initial summary.

* * * * *